United States Patent
Huerta et al.

(10) Patent No.: US 7,437,707 B2
(45) Date of Patent: Oct. 14, 2008

(54) SYSTEMS AND METHODS FOR GENERATING APPLICATIONS THAT ARE AUTOMATICALLY OPTIMIZED FOR NETWORK PERFORMANCE

(75) Inventors: Juan M. Huerta, Bronx, NY (US); David M. Lubensky, Brookfield, CT (US); Chaitanya J. K. Ekanadham, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 10/734,295

(22) Filed: Dec. 12, 2003

(65) Prior Publication Data
US 2005/0132323 A1   Jun. 16, 2005

(51) Int. Cl.
G06F 9/45 (2006.01)
(52) U.S. Cl. ...................................................... 717/104
(58) Field of Classification Search ................. 717/151, 717/104; 716/18
See application file for complete search history.

(56) References Cited

U.S. PATENT DOCUMENTS

| | | | | | |
|---|---|---|---|---|---|
| 5,544,066 | A | * | 8/1996 | Rostoker et al. | 716/18 |
| 5,623,418 | A | * | 4/1997 | Rostoker et al. | 716/1 |
| 6,145,117 | A | * | 11/2000 | Eng | 716/18 |
| 6,381,628 | B1 | * | 4/2002 | Hunt | 709/201 |
| 6,405,361 | B1 | * | 6/2002 | Broy et al. | 717/104 |
| 6,668,312 | B2 | * | 12/2003 | Aubury | 711/170 |
| 6,983,463 | B1 | * | 1/2006 | Hunt | 719/316 |
| 2002/0100029 | A1 | * | 7/2002 | Bowen | 717/140 |

* cited by examiner

*Primary Examiner*—John Chavis
(74) *Attorney, Agent, or Firm*—F. Chau & Associates, LLC (57) ABSTRACT

Systems, methods and tools are provided for generating applications that are automatically optimized for efficient deployment in a computing environment based on parameterized criteria. In particular, systems, methods and tools for generating network applications are provided, which automatically partition a functional description of a network application into a set of application modules (e.g., pages) according to parameterized criteria that optimizes the network application for efficient network performance by minimizing application latency.

36 Claims, 5 Drawing Sheets

SYSTEMS AND METHODS FOR GENERATING APPLICATIONS THAT ARE AUTOMATICALLY OPTIMIZED FOR NETWORK PERFORMANCE

TECHNICAL FIELD OF THE INVENTION

The present invention relates generally to systems, methods and tools for generating applications that are automatically optimized for efficient deployment in a computing environment based on parameterized criteria. In particular, the invention relates to systems, methods and tools for generating network applications, which automatically partition a functional description of a network application into a set of application modules (e.g., pages) according to parameterized criteria that optimizes the network application for efficient network performance by minimizing application latency.

BACKGROUND

Due to innovations in network computing technologies and application development, many companies, businesses and organizations, for example, are providing e-business services on global communication networks such as the WWW (World Wide Web) and the Internet. Such services are implemented as applications, which are accessible through an entity's Web site or a third-party host system, for example, and which are executed using a client/server configuration through a network connection. In a client/server system, a server dispatches an application and data to a client through a network connection. A client/server system may comprise a Web server, which responds to requests for programs or data from a web browser client executing on a client device or gateway node.

There are various commercially available application development tools, which can be used for designing complex applications, such as Web applications. For example, application development tools for constructing Web-based applications (such as speech applications) generally include what is referred to herein as (i) "flowchart" based tools and (ii) "Rapid Application Development" (RAD) based tools.

In general, flowchart based tools provide a graphical user interface (GUI) that allows a developer to design a flowchart of an application, and possibly generate the markup of the application. In a flowchart based tool, an application is represented as a flowchart containing nodes and edges that connect the nodes. The flowchart based tools process the flowchart description of the application and render the entire application into a single "page" (i.e., monolithic application), wherein the corresponding server code, client pages, and application artifacts are generated in terms of a single-page application.

Flowchart based tools that generate a monolithic application (e.g., a single JSP) are not particularly suitable for developing large-scale Web applications, for example. Indeed, for purposes of efficient functionality, large-scale Web applications are typically designed using multiple pages so that each page is of reasonable size. As such, individual pages of the application can be invoked when their content is needed, which renders the application more efficient than if all the content was placed in a single large page. The efficiency of a monolithic application is extremely limited because a user would have to download and process the entire content of the application notwithstanding that the user may only traverse a certain path of the application that uses a small portion of the entire application content.

RAD based development tools typically include textual and graphical editors, which allow a developer to manually generate a document for each page of an application and the tool automatically generates the server code. With RAD based tools, the user has to manually specify the segmentation of the application into pages, which requires a high level of knowledge and expertise on the part of the developer in order to produce a reasonably efficient and balanced application Although RAD based tools can be used by a power-developer for generating well-designed applications, such tools lack a simple user interface and are thus insufficient for use by inexperienced application developers. In addition, since modularization of the application must be done manually, the application developer may generate an application that does not provide an optimal balance between the number of pages and content of the pages, which can render the application functionally inefficient. For instance, if the application comprises a relatively large number of pages, the efficiency of the application can be reduced due to the overhead associated with multiple page requests and transmissions, especially when frequently traversed paths of the application comprise a significantly large number of pages.

SUMMARY OF THE INVENTION

Exemplary embodiments of the invention generally include systems, methods and tools for generating applications that are automatically optimized for efficient deployment in a computing environment based on parameterized criteria. More specifically, exemplary embodiments of the invention include systems, methods and tools for generating network applications, which automatically partition a functional description of a network application into a set of application modules (e.g., pages) according to parameterized criteria that optimizes the network application for efficient network performance by minimizing application latency. Moreover, exemplary embodiments of the invention further include automated application optimization systems and methods for dynamically optimizing run-time performance of network applications.

More specifically, in one exemplary embodiment of the invention, a method for generating an application, comprises receiving a functional description of an application, and automatically partitioning the functional description of the application into a plurality of modules based on parameterized criteria. The functional description of the application can be, for example, a flowchart description or a markup description of the application.

In another exemplary embodiment of the invention, the parameterized criteria comprises a measure of application latency, wherein a process of automatic partitioning includes partitioning the functional description of the application into a plurality of different partitions, and using the parameterized criteria to determine which partition, among the plurality of different partitions, provides a minimal application latency.

In other exemplary embodiments of the invention, the parameterized criteria comprises a cost function that is based on transmission and compilation times as a function of different size modules, as the measure of application latency. The parameterized criteria may further comprise a probability measure for determining a probability of a given path in a partition being traversed.

In yet other exemplary embodiments of the invention, the method further comprises automatically generating application code for each module and automatically generating a controller that can navigate between the modules of the application.

In another exemplary embodiment of the invention, a method for generating an application comprises receiving a functional description of a network application and automatically partitioning the functional description of the network application into a plurality of pages based on parameterized criteria of network latency. The network application may comprise, for example, a client-server application or a Web application.

These and other exemplary embodiments, aspects, features, and advantages of the present invention will become apparent from the following detailed description of the preferred embodiments, which is to be read in connection with the accompanying drawings.

DETAILED DESCRIPTION OF EXEMPLARY EMBODIMENTS

In general, exemplary embodiments of the invention include systems, methods and tools (or toolkits) for generating applications that are automatically optimized according to parameterized criteria for deployment in a computing environment In one exemplary embodiment, the parameterized criteria provides an objective metric/function to measure (or otherwise evaluate) the runtime "efficiency" of an application in a computing environment based on resources and characteristics of the computing environment. For example, the parameterized criteria may comprise cost functions that reflect resource utilization costs, such that an application design can be automatically optimized by minimizing the costs of resource utilization in the environment in which the application is employed. Furthermore, application development and optimization tools according to exemplary embodiments of the invention allow such cost functions (which reflect resource utilization costs) to be dynamically updated or modified thereby enabling the run-time performance of applications to be dynamically optimized.

Other exemplary embodiments of the invention include systems, methods and tools for generating network applications that are optimized for efficient network performance. In particular, automated optimization methods are implemented to automatically partition a functional description (e.g., a flowchart description) of a network application into a set of application modules (e.g., pages) according to parameterized criteria that optimizes the network application for efficient network performance by minimizing application latency. As explained in detail below, various optimization parameters can be used for establishing a parameterized criteria, wherein the optimization parameters are based on various factors such as network configurations, characteristics, conditions and resources.

It is to be understood that systems and methods according to exemplary embodiments of the invention may be implemented in various forms of hardware, software, firmware, special purpose processors, or a combination thereof. In particular, in one exemplary embodiment, the present invention is implemented as an application comprising program instructions that are tangibly embodied on one or more program storage devices (e.g., hard disk, magnetic floppy disk, RAM, ROM, CD ROM, etc.) and executable by any device or machine comprising suitable architecture. It is to be further understood that, because some of the constituent system components and process steps depicted in the accompanying Figures can be implemented in software, the connections between system modules (or the logic flow of method steps) may differ depending upon the manner in which the present invention is programmed. Given the teachings herein, one of ordinary skill in the related art will be able to contemplate these and similar implementations or configurations of the present invention.

Figure 1:
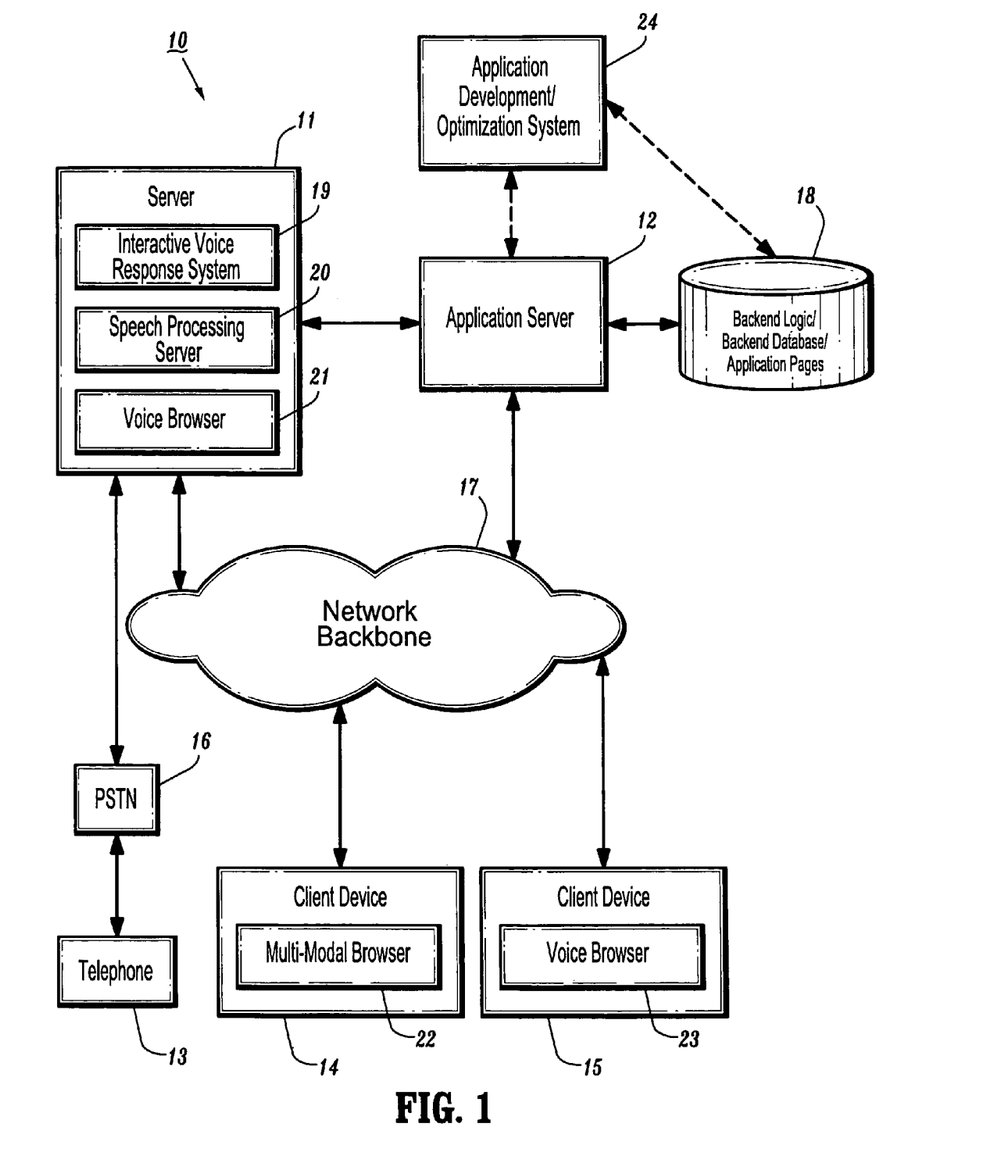
FIG. 1 is a block diagram illustrating a network environment for development and optimization of network applications according to an exemplary embodiment of the invention.

Referring now to FIG. 1, a block diagram illustrates a network environment for development and deployment of network applications, according to an exemplary embodiment of the invention. In general, the exemplary network environment depicted in FIG. 1 comprises a client-server network system (10) that includes a voice server (11) and an application server (12), which are accessible by various client devices (13), (14), and (15) over any one of a variety of communication networks (16), (17).

The application server (12) can host one or more applications, wherein the application server (12) obtains content pages and/or data associated with a given application from a backend repository (18) in response to client requests and dispatches the requested content pages and/or data. The applications stored in backed repository (18) may include, for example, applications comprising content pages that are authored using VoiceXML, HTML, WML, ASP, JSP, etc. The backed repository (18) further comprises the backed business logic, scripts, reusable application components, etc., which are used by the application server (12) for, e.g., processing and retrieving data from a backend legacy database and server-side processing to dynamically generate content for JSP pages.

The client-server network system (10) further comprises an application development/optimization system (24). In one exemplary embodiment of the invention, the system (24) can be used for off-line development of network applications that are automatically optimized for efficient deployment in the network (10). In another embodiment, the system (24) can be used on-line for dynamically optimizing the run-time performance of an application hosted by the application server (12). As explained in detail below, the system (24) implements an automated optimization method that processes a functional description of an application (e.g., flowchart) using parameterized criteria for optimizing a partitioning of an application into a plurality of fragments (pages) based on, e.g., characteristics and resources of the network system (10). More specifically, by way of example, the parameterized criteria can be based on factors such as network delays, latencies, bandwidth limitations, network overload, and/or limitation of client or server resources.

The voice server (11) comprises an IVR (interactive Voice Response) system (19), a speech processing server (20) and a voice browser (21). The voice browser (21) can be used for accessing and rendering content pages (e.g., VoiceXML, JSP, etc.) of a speech application that is hosted by the application server (12). In addition, the voice browser (21) can pass data (as provided by a user) to the application server (12) for backed processing. The voice server (11) functions as a gateway server that enables a user to link to the application server (12) (or any other application server) hosting a speech application (e.g., VoiceXML application) by directing the voice browser (21) to the correct URL, for example.

The IVR system (19) includes telephony resources that provide IVR functionality such as inbound call handling, inbound and outbound call routing, audio playback, etc. The speech processing server (20) comprises one or more speech engines providing speech-based processing for the voice browser (21). By way of example, the speech engines may include an ASR (automatic speech recognition) engine, a NL (natural language) parser engine, a TTS (text-to-speech) engine, and a SPID (speaker identification/verification) engine, and/or any other engines/processors that are used for pre/post processing audio (speech) signals, such as uplink/downlink codecs for encoding/decoding audio data transmitted over the network.

The voice server (11) and application server (12) can be collocated or linked via an IP network (e.g., HTTP connection). Further, the IVR system (19), speech processing server (20) and voice browser (21) can be located on the same server machine (as depicted in FIG. 1), but such systems may be remotely distributed on different nodes of the network.

A user can access and interact with an application hosted by the application server (12) using any one of a plurality of client devices. For instance, a user can connect to the voice server (11) using a telephone device (13) over a PSTN (public switched telephone network), wherein the user can access a speech-enabled IVR application via the voice browser (21).

Furthermore, the user can access the application server (12) via a network connection over network (17) using, for example, client device (14) having a multi-modal browser (22), or client device (15) having a voice browser (23). The clients (14), (15) may be personal computers that can transmit access requests to the application server (12) via the respective MM browser (22) and voice browser (23) and download content pages over a PSTN or wireless network (e.g., 2G, 2.5G., 3G, etc.) or a dedicated TCP/IP or UDP connection. The clients (14), (15) may be wireless devices (e.g., cellular telephone, portable computer, PDA, etc.) that can access the application server (12) via a wireless network (using WAP (wireless application protocol). In this regard, it is to be understood that the communications network (17) includes the backbone infrastructure, resources, gateways, etc., for supporting wireless access, VoIP access, HTTP access, PSTN, access, etc. It is to be understood that FIG. 1 is an exemplary network environment and that other "channels" and networks/connectivity can be employed, and nothing herein shall be construed as a limitation of the scope of the invention.

Figure 2:
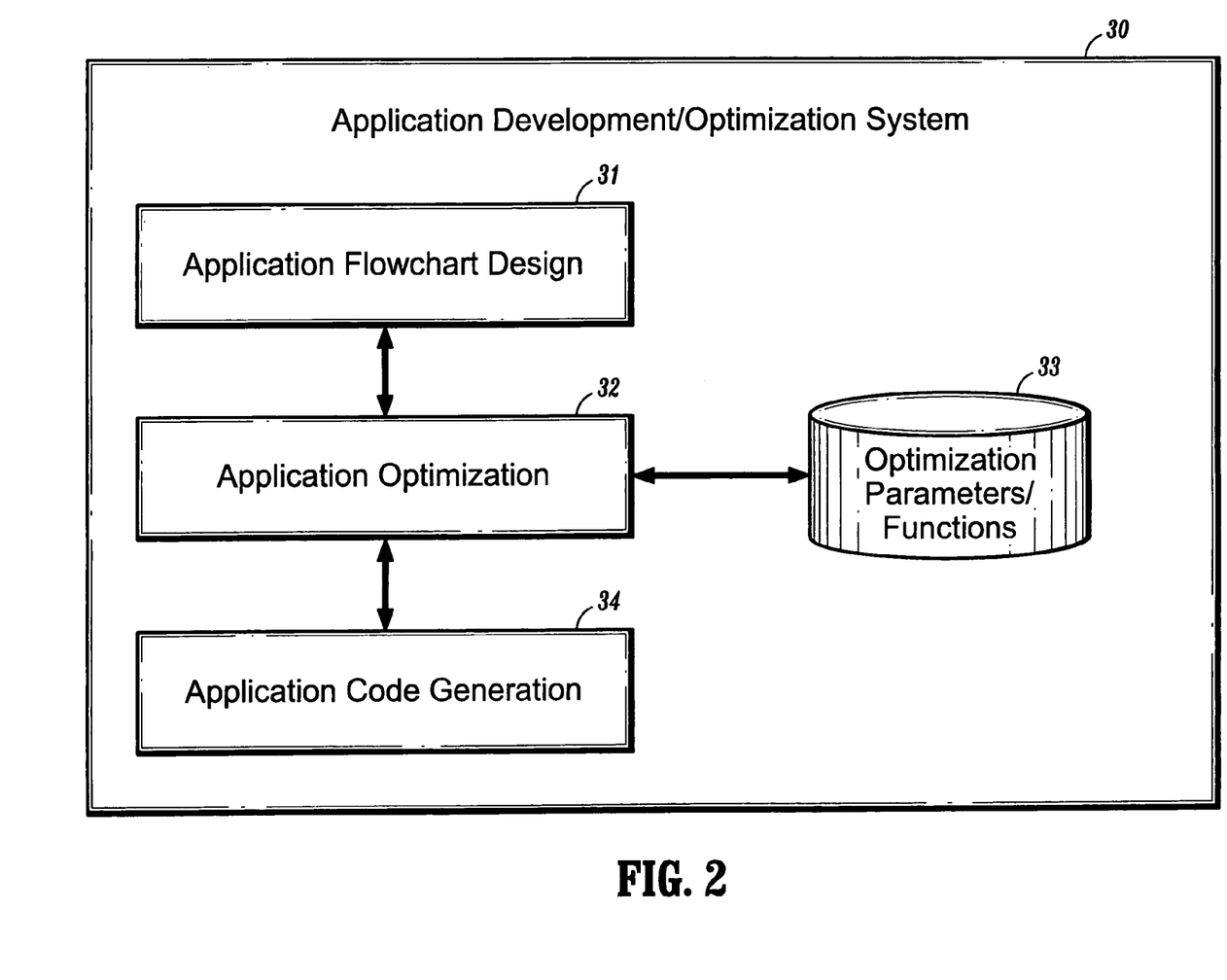
FIG. 2 is a block diagram illustrating an application development and optimization system according to an exemplary embodiment of the invention.

Referring now to FIG. 2, a high-level block diagram illustrates an application development and optimization system according to an exemplary embodiment of the invention. More specifically, FIG. 2 illustrates an exemplary embodiment of an application development tool that can be implemented for off-line application design and development. FIG. 2 illustrates one exemplary embodiment of the application development/optimization system (24) of FIG. 1 which can be used for designing a voice-based application such as a VoiceXML application for IVR. In general, the system (30) comprises a design module (31), an optimization module (32), persistent storage for optimization parameters/functions (33) and a code generation module (34).

The design module (31) comprises methods and user interfaces that enable a user (developer) to generate a functional description of an application. For example, in one exemplary embodiment of the invention, the design module (31) comprises a GUI-based interface that enables logical design visualization, comprising "click and drag" functionality that allows user to select application elements (e.g., inputs, outputs, blocks, menus, etc.) to construct a flowchart description of an application. In another exemplary embodiment of the invention, a functional description of the application can be represented by particular markup for a given application, such as VoiceXML for voice applications, HTML for GUI-based applications, WML for limited GUI-based applications, modality-independent markup such as IML (interactive markup language) for multi-modal or conversational applications, or other markup languages.

The optimization module (32) parses and processes the functional description (e.g., flowchart) of an application and automatically determines an "optimal" partition of the application based on a parameterized criteria (or "optimization function") that is established using optimization parameters stored in persistent storage (33). In one exemplary embodiment of the invention, optimization parameters correspond to, or are otherwise representative of, characteristics/resources of the computing environment in which the application is to be deployed. In one exemplary embodiment, optimization functions (parameterized criteria) are expressed as metrics or cost functions, which used for measuring or evaluating the runtime "efficiency" of a given partition of a network application based on resources and characteristics of the computing environment. Various optimization parameters according to exemplary embodiments of the invention will be described in further detail below.

The optimization module (32) generates a plurality of different partitions of the application, wherein each partition comprises one or more application fragments (or pages). For each partition of the application, the optimization module (32) determines the "efficiency" of the partition based on the optimization function(s) (33). The most "efficient" partition (as evaluated using the optimization function(s)) is selected as the optimal partition.

The code generation module (34) receives and processes the functional description and optimal partition of the application and automatically renders the application in accordance with the functional description and optimal partition by automatically generating the application code (e.g., the code and/or markup associated with each page and the application (server-side) server code).

It is to be understood that the system depicted in FIG. 2 is one exemplary embodiment of an integrated application development tool comprising functional modules (31), (32) and (34), and that other tool frameworks can be readily envisioned by those of ordinary skill in the art based on the teachings herein. For example, in other exemplary embodiments of the invention, an application development tool may comprise the optimization module (32) only, wherein such tool is designed to be compatible with other stand-alone application development tools that provide functionalities similar to, or the same as, those functionalities of modules (31) and/or (34) as described herein. For example, the user interface for generating an application flowchart can be any suitable flowchart based GUI-based tool.

Furthermore, in other exemplary embodiments of the invention, an application optimization system comprising the optimization module (32) and optimization parameters (33) can be implemented in a run-time engine, for example, to provide dynamic reconfiguration (or runtime remodularization) of an application in accordance with changes in the characteristics of the network environment in which the application is deployed. For instance, in one embodiment, different optimization parameters/functions can be defined for different network conditions. In such case, the functional description of the application (which is persistently stored) can be subjected to an optimization process using the relevant optimization functions/parameters to obtain the optimal partition.

In other exemplary embodiments, the optimization parameters/functions can be dynamically adjusted/adapted in accordance with changes in the characteristics or conditions of the network. For instance, systems can be implemented for active monitoring of network behavior/conditions (e.g., network/server loads), and observed changes in network resources, conditions, behavior, etc., can be reflected by modifying the optimization parameters/functions. In other embodiments of the invention, the optimization parameters/functions are flexible and can be modified based on user specifications or altered to reflect actual (measured/observed) network behavior and conditions.

It is to be appreciated that the optimization parameters, which are used for establishing a parameterized criteria for evaluating the efficiency of a given partition of an application during an automated optimization process, can be specified based on various characteristics associated with a given environment in which the application is deployed, and nothing herein should be construed as placing any limitation on the invention. For example, in one exemplary embodiment, the parameterized criteria (optimization functions) may comprise predefined, objective criteria that consider, for example, network characteristics, conditions, and resources, as well client characteristics and resources. For example, a parameterized criteria can be expressed using a cost function, which provides an objective measure of efficiency of an application based on objective criteria as specified by optimization parameters In one exemplary embodiment of the invention described in detail below, an "average application latency" is used as a measure of efficiency of an application. In particular, one factor that affects the efficiency of a network application (at least from the perspective of the application user) is the time delay (or latency) experienced by the user as he/she uses an application over a network connection. For example, in client/server network, there are various factors that can directly inhibit the performance and robustness of an application that is administered by an application/web server over a network connection. Such factors include, for example, the time delays that are incurred due to transmitting data between a client and server, as well as the time delays that are incurred due to processing data by a server or client.

More specifically, by way of example, in a client-server network system such as depicted in FIG. 1, a user can access a server (e.g., web server) using a client application (e.g., browser) that resides on a local device (e.g., the user's cell phone or laptop) or on a remote device (e.g., voice server). The user interacts with the client via a user interface (speech interface, GUI interface, multi-modal interface), and initiates the process of accessing an application by giving a corresponding address to the client. The client converts this implicit or explicit command into a request to the server. After receiving the request, the server initiates a session with the user and initiates the application by dispatching a page of the application to the client. The client receives the page and executes/interprets the page. The user interacts with the client according to the markup of the page. After certain predefined data or actions are collected or completed, a submission from the client to the server is made, which typically results in a subsequent page submission from the server to the client and execution of the page by the client. Eventually, after several interactions between the server and client, the server may perform a backed transaction through a backed connection, and send the results of such transaction (for example, making a flight reservation) to the client.

In the above described client-sever interaction, the amount of latency incurred through interaction with a client is primarily affected by the amount of data needed to be sent, received, or processed at a single time. Typically, the amount of data clustered into a single data-exchange instance refers to a "page" of the application. An application may be broken up into pages in various ways, ranging from single-page applications to highly partitioned applications in which every atomic component of the application is contained in a page of its own. Depending on how an application is partitioned, however, the overall application latency experienced by the user can vary.

Figure 3A:
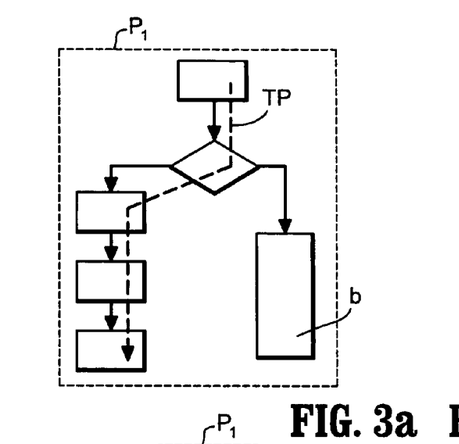
FIGS. 3A-3F are exemplary diagrams that illustrate application latency incurred in a client-server network for different fragmentations of a given application.
Figure 3B:
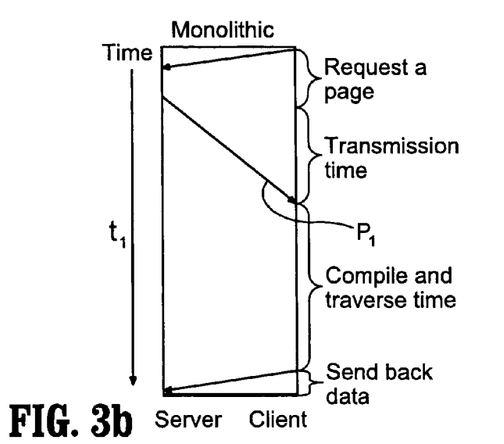
Figure 3C:
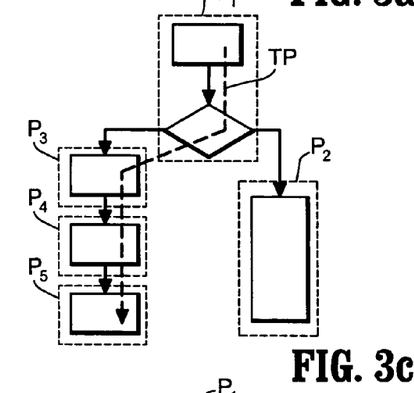
Figure 3D:
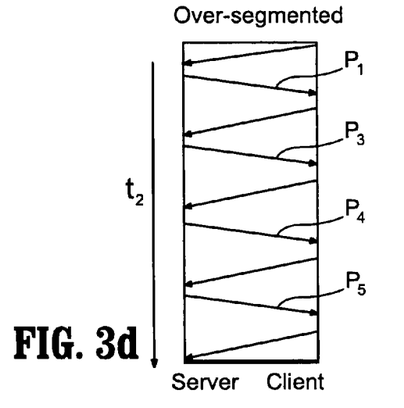
Figure 3E:
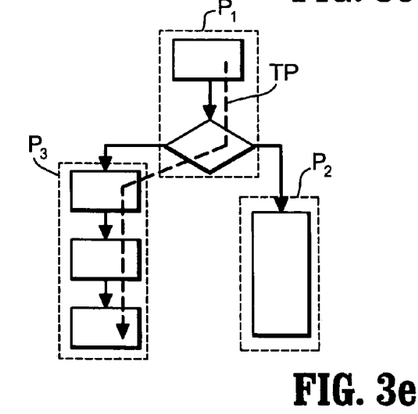

For example, FIGS. 3A-3F are exemplary diagrams that illustrate application latency that can be incurred in a client-server network for different fragmentations of a given application. FIGS. 3A, 3C and 3E depict an application (in flowchart form) that is fragmented into different pages. In particular, FIG. 3A illustrates the application fragmented into a single page ($P_1$), FIG. 3C illustrates the application fragmented into five pages ($P_1$~$P_5$), and FIG. 3E illustrates the application fragmented into three pages ($P_1$~$P_3$). Each page represents a blocked fragment of various elements/components of the application, which is transmitted as a single entity through the network from a server (web application server) to a client (browser). For example, in a web application, a page typically comprises markup data (e.g., HTML, VoiceXML, WML, etc.) that is parsed and rendered by a client browser application.

Figure 3F:
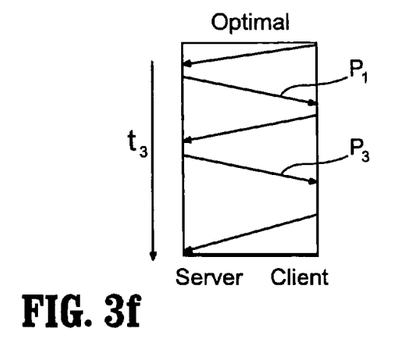

FIGS. 3B, 3D and 3F are exemplary diagrams illustrating different latencies (times, $t_1$, $t_2$, and $t_3$) that are incurred for the fragmented applications 3A, 3B, and 3C, respectively, for the same traversed path (TP) as indicated by the dashed line through the application. In particular, FIG. 3B illustrates that application latency ($t_1$) is incurred due to time delays associated with (i) a client request for a given page (which includes the time for server-side processing to dynamically generate a page ($P_1$) via, e.g., JSP) (ii) transmitting the page ($P_1$) from the server to the client, (iii) compiling the page ($P_1$) and traversing the page ($P_1$) along the desired path (TP) and (iv) sending data from the client to the server (e.g., submitted filled form).

FIGS. 3A and 3B illustrate a monolithic approach (as with conventional flowchart based application development tools), wherein the application is represented as a single page, i.e., the application is transmitted in its entirety as a single page to the client. A monolithic application (or an under-fragmented application) can be sub-optimal in terms of latency because the low-level resolution of the application will force unnecessary data to be bundled together with useful data. For example, as depicted in FIG. 3A, the block of data (b) associated with the page ($P_1$) is unnecessarily transmitted and processed since the block (b) is not traversed for the path (TP). In other words, the efficiency is extremely limited because a user traversing the path (TP) only uses a small fraction of the application content, but would still have to download and process the entire content of the page ($P_1$).

Further, FIG. 3D illustrates application latency ($t_2$) that is incurred due to time delays associated with (i) multiple client requests for multiple pages $P_1$, $P_3$, $P_4$ and $P_5$, which are needed for traversing the path (TP) (ii) transmitting the pages $P_1$, $P_3$, $P_4$ and $P_5$ from the server to the client, (iii) and compiling the pages $P_1$, $P_3$, $P_4$ and $P_5$ and traversing such pages along the desired path (TP) and (iv) sending data from the client to the server.

FIGS. 3C and 3D illustrate an over-fragmented application that can be obtained using conventional RAD tools, for example, where the application is fragmented into a relatively large number of pages. An over-fragmented application can result in large latency because of the incurred overhead that exists in each page submission. For example, although the block of data (b) associated with the page ($P_2$) (FIG. 3C) is not transmitted to the client for the given traversed path (TP), the traversed path (TP) requires 4 page submissions (FIG. 3D), which incurs significant overhead due to the latency associated with the multiple page requests and transmissions that are needed for traversing the desired path (TP). Indeed, as indicated in FIGS. 3B and 3D, the latencies ($t_1$) and ($t_2$) are relatively the same, even though the page ($P_2$) is not sent to the client and compiled (as with block (b) in FIG. 3A).

Further, FIG. 3F illustrates application latency ($t_3$) that is incurred for processing pages ($P_1$) and ($P_3$) for the traversed path (TP), which is significantly less than the latencies ($t_2$) and ($t_1$). FIGS. 3E and 3F illustrate an optimal fragmented application, which can be obtained using an automated optimization method according to an embodiment of the invention. The application fragmentation of FIG. 3E illustrates an optimal fragmentation that finds a balance between page size and number of pages.

It is to be appreciated that FIGS. 3A-3F are exemplary of an application optimization method according to an exemplary embodiment of the invention for determining an optimal partition of an application into fragments (pages), which would minimize application latency. In such exemplary embodiment, optimization parameters can be expressed as cost functions of transmission and compiling time as a function of page size, which are used for evaluating the latency associated with given partition of the application. These cost functions can be objective criteria based on analyses performed on a particular network and client configuration and resources. The partitioning process is performed to determine an optimal partition of a given application, i.e., the partition that provides the minimum "average application latency". In such exemplary embodiment, an automated partitioning method is performed to minimize the average latency for run-time deployment of the application on a network.

Figure 4:
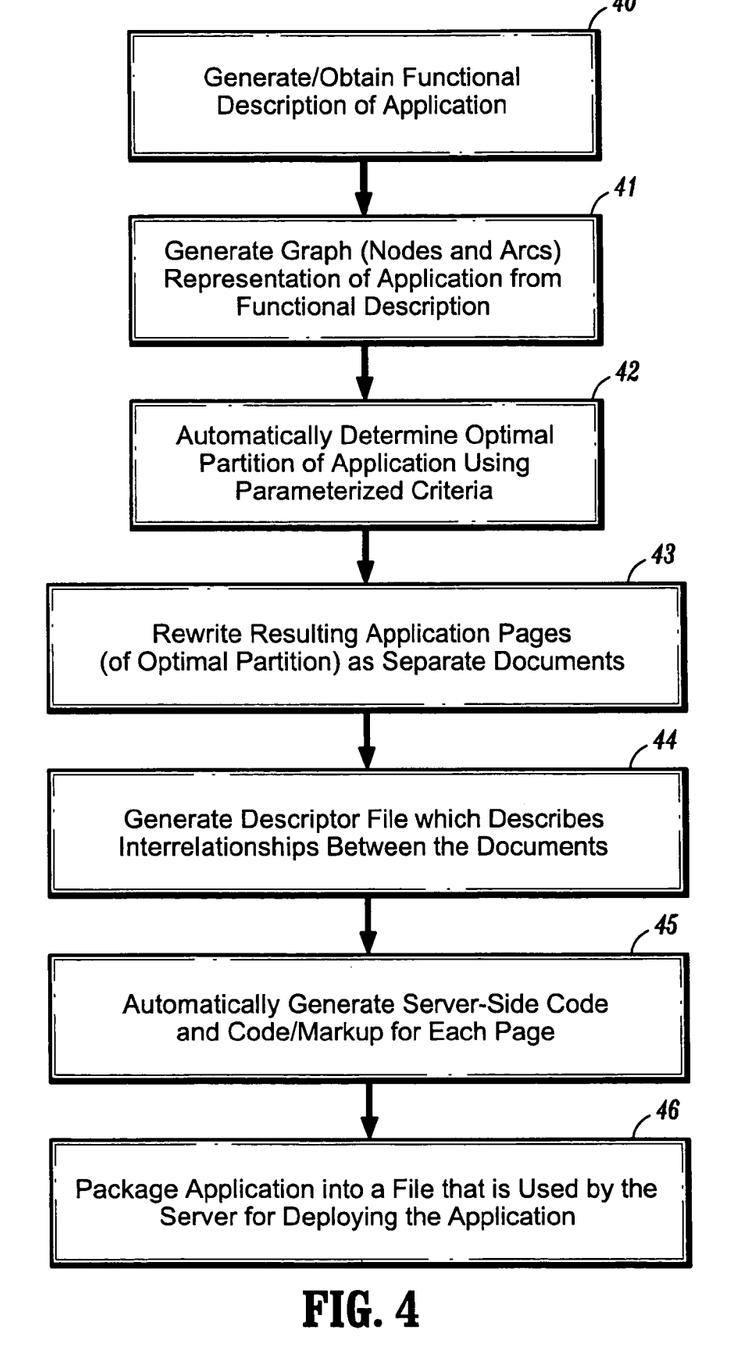
FIG. 4 is a flow diagram illustrating a method for generating an application according to an exemplary embodiment of the invention.

Referring now to FIG. 4, a flow diagram illustrates a method for generating an application according to an exemplary embodiment of the invention. Initially, a user (developer) generates (off-line) a functional description of an application (step 40). As noted above, the functional description may comprise a flowchart which is generated using a GUI-based interface, wherein the flowchart comprises elements representing typical application elements (e.g., VoiceXML elements for voice applications) such as inputs, outputs, blocks, menus, etc., as well as logical connections between such elements. In another exemplary embodiment of the invention, the functional description of the application can be generated using markup. In yet another embodiment, step 40 may comprise obtaining a previously generated functional description of the application from a persistent storage medium, for the purpose of dynamically reconfiguring the application (on-line optimization).

Figure 5A:
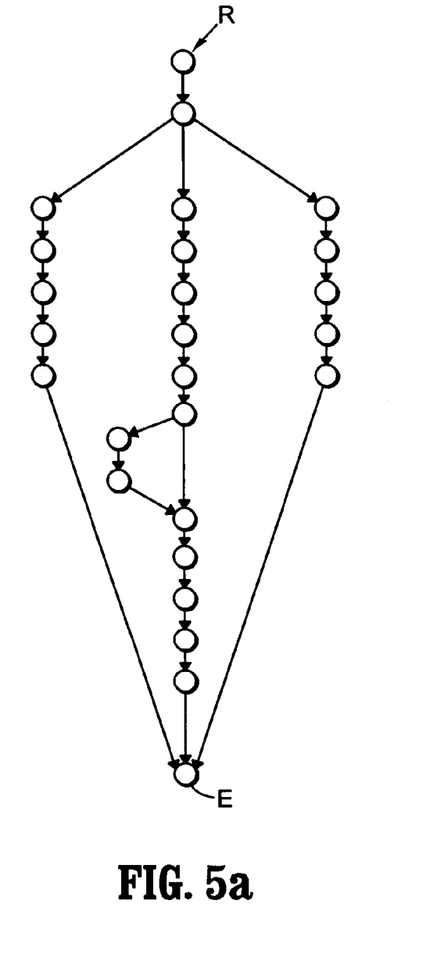
FIGS. 5a and 5b are exemplary diagrams that illustrate a method for automatically partitioning an application into a plurality of modules (pages), according to an exemplary embodiment of the invention.

Next, the functional description of the application is parsed and processed to generate a graph representation of the application, wherein the graph comprises a set of nodes and arcs (e.g., a directed, acyclic graph). For instance, FIG. 5A illustrates an exemplary graph representation of a given application. As depicted in FIG. 5A, the graph comprises a plurality of nodes representing application elements, which are connected by arcs.

The application representation is then processed using an optimization method according to an embodiment of the invention that automatically determines an "optimal" partition of the application using parameterized criteria (step 42). More specifically, in one exemplary embodiment of the invention, the optimization method comprises generating a plurality of different partitions of the application, wherein each partition of the application comprises a set of one or more application fragments (pages). For each partition, an "average application latency" is determined using a cost function for application latency that is defined using costs of transmission and compilation time as a function of page size (an exemplary cost function will be described below). In particular, in one exemplary embodiment of the invention, the average application latency for a given partition is computed as the sum of the latency of each path over all possible paths in the application for the given partition. The latency of a path in a given partition is determined by adding the time it takes for the transmission of the pages traversed in that path, plus the time it takes to compile such pages in the client, plus the time the user takes to traverse the pages plus the time it takes to send requests to the server by the client for more pages. The optimization is performed to determine the partition of the application (i.e., the set of fragments (pages)) that results in the minimum average application latency. A dynamic programming routine can be applied for efficiently determining the partition which results in the minimum average latency.

Once the optimal partition is determined (step 42), the resulting pages are written as separate documents (files) (step 43) and a descriptor file is generated (step 44) (referred to herein as the "controller file"), which specifies the relationship between the separate pages (documents/files). Next, the controller file and application pages are processed to automatically generate the application pages (the code and/or markup associated with each page) and the application (server-side) server code, which supports the dispatching of the pages (step 45). More specifically, in one exemplary embodiment of the invention in which an MVC-based application is generated, this step involves generating the Model, Views and the Controller. For example, the "Controller" may comprise an XML document that describes the dialogs, their composite nodes, and transitions, and the "View" pages may comprises JSP's corresponding to the clustered nodes of the partition. The "Model" (e.g., a java bean) is extended to include supporting functions (methods) for the partition. The generation of the code and of the application artifacts can be performed using currently existing tools such as MDAT.

The resulting pages and code are packaged into a file that is used in deployment by the server (step 46). The application is generated (e.g., action servelets, STRUTS-based artifacts) and packaged into a deployable file.

As noted above, an automated optimization (partitioning) process according to one exemplary embodiment of the invention is implemented using an interactive method which, in general, processes a functional representation of an application to generate a plurality of different partitions of the application and automatically determine the "optimal" partition as that partition which minimizes the average latency of the application, which is denoted by $L_{App}$. In one exemplary embodiment of the invention, a cost function which can be used for deriving values for $L_{App}$ for a given partition, is as follows:

$$L_{App} = \sum_{i=i}^{k} P(a_i, b_i) \cdot [k \cdot g(W(C_{a_i})) + g(W(C_{b_i})) + f(W(C_{b_i}))] +$$

$$\sum_{j=i}^{m} P(a_j, b_j) \cdot g(W(C_{a_j}))$$

During an automated optimization process according to the invention, the cost function for $L_{App}$ can be used for determining the application latency for each partition of an application to thereby determine which partition results in the minimal latency. The cost function takes into consideration a plurality of factors that affect average application latency. In particular, Cx denotes a fragment x (e.g., JSP file) that contains all nodes of a given node cluster (fragment). The term W(Cx) represents the total "weight" associated with a single fragment (or block of data) (e.g., JSP page). The term $f$(W (Cx)) denotes the "cost" associated with compiling/processing the fragment. The term g(W(Cx)) denotes the "cost" associated with transmitting the fragment (from server to client). The term k*g(Cx), for 0<k<1 denotes the "cost" associated with sending information from a client to the server (e.g., submitting forms), wherein it is assumed that such value is a fraction of the time it takes to send the entire fragment (page)). The term (a,b) denotes an "arc" between node a and node b. The term P(a,b) for arc (a,b) denotes the "weighted frequency" of an arc, depending on the group of paths which contain that arc and their probabilities of being traversed. The higher this value, the more likely that arc is to be traversed.

The above cost function for $L_{App}$, includes cost functions for transmission time g(W(Cx)) and compilation time $f$(W (Cx)) as a function of page size, for computation of application latency for a given partition. These cost functions can be determined based on analyses performed on particular network and client configuration and resources. The simplest assumptions are that such functions are linear and do not change through time. However, such functions can be time-varying, nonlinear, or be expressed as tables and reflect actual network behavior.

The above cost function for $L_{App}$ comprises a first summation component for "i=1 to k" and a second summation component for "j=1 to m". The first summation component is for all pairs of node that are not root nodes, whereas the second summation for all nodes connected directly to the root node. In particular, the first summation component is for each arc i=(a,b), the arc between node a and node b for which a and b are in different pages or fragments. The application has k such arcs. The second summation component is for each arc j=(a, b), where j is the root node of the entire graph, wherein the root node has m outgoing arcs. The above cost function considers only the scenario of having partitions with two or more pages or fragments. For the particular case of a single page partition, the average latency $L_{App}$ will simply be equal to the cost of sending the single page g(W(Cx)) plus the cost of compiling and processing it $f$(W(Cx)) plus the proportional cost k*g(W(Cx)) of sending information to the client.

Figure 5B:
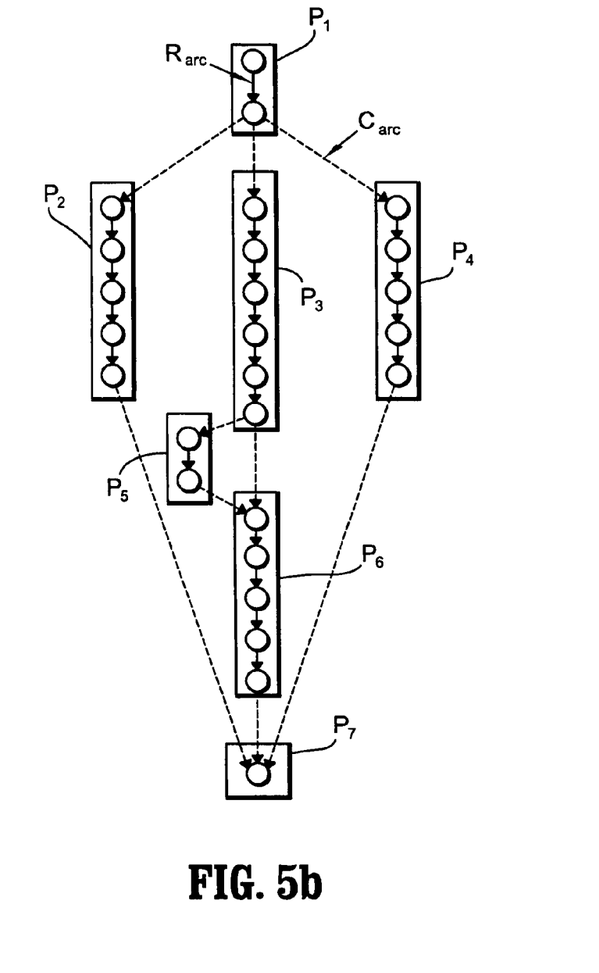

Referring to FIGS. 5A and 5B, a node representation in FIG. 5A illustrates an application having a total of 4 possible paths that can be traversed from a root node (R) to an end node (E). FIG. 5B illustrates one partition of the node graph representation of FIG. 5A, which comprises 7 fragments (pages) or "node clusters", $P_1 \sim P_7$. For the partition of FIG. 5B, each dotted line represents a "critical arc" ($C_{arc}$) between application fragments. In addition, the exemplary partition of FIG. 5B comprises 1 root arc ($R_{arc}$).

In one exemplary embodiment of the invention, an application development tool can implement an automated partitioning process that uses an assigned "color" property for each node of a graph (FIG. 5A) as a basis for fragmenting the node graph (FIG. 5B). For instance, in the exemplary application partition of FIG. 5B, each node in a corresponding page/fragment/node cluster can be represented by the same color (as opposed to being surrounded by a block as in the exemplary diagram), and each different page/fragment/node cluster can have different colors. This enables an application developer to easily identify a given partition for the application as determined by the application development tool.

The following discussion is one exemplary embodiment of an automated partitioning process in which an application development tool utilizes the cost function $L_{App}$ discussed above, as well as "colors" for determining an optimal partition. To begin, in one exemplary embodiment of the invention, the partitioning process can implement constraints for validating a specific fragmentation of the graph, e.g., that each fragment must: (1) have one initial (root) node only (although multiple terminal nodes are allowed); (2) be connected to graphs themselves (no new arcs can be formed); and (3) a node that is labeled as a "break" node is always a terminal nodes in its containing fragment (e.g., a node which the user specifies must be followed by a trip to the server (e.g., submit elements for forms)).

Assuming a node graph (e.g., FIG. 5A) having N nodes, the maximum number of fragments possible, and therefore the maximum number of distinct colors is N. A node stack (stack X) of maximum capacity N is initially created having a bottom element being the root node. Initially, the other elements (nodes) are empty. Simultaneously, three other stacks C, A and B are created for (i) color weights, (ii) coefficients of $f$, and (iii) coefficients of g, respectively, which grow and shrink in parallel with node stack X.

The node stack X has an element data type Object[8], which contains properties of the nodes (e.g., name, color, children, parents, etc.)

The color weights stack C has an element data type double [N], which is indexed by an integer "Color", wherein the first array element is initialized as 0.0 for all indices. For a top array element, Ctop, Ctop[x] represents a cumulative sum of the weights of all nodes in the stack having color x.

For the coefficients of $f$, stack A has an element data type double[N], which is indexed by an integer "Color", wherein the first array element is initialized as 0.0 for all indices. For a top array element, Atop, Atop[x] is a cumulative sum of the coefficients of the function $f$ for color x, as defined above.

For the coefficients of g, stack B has an element data type double[N], which is indexed by the integer "Color", wherein a first array element is initialized as 0.0 for all indices. For a top array element, Btop, Btop[x] is the cumulative sum of the coefficients of the function g (as defined above) for color x.

Each time a node is added to the stack (including the initial root node addition), the node is assigned a "new distinct" color. The stack is then scanned top to bottom for any new "critical arcs" that may be formed (between stacked nodes only, because nodes yet to be stacked are colorless at this point) from the addition of the node. If newly formed critical arc(s) exits, they are used to update the values at the indices (denoted by "Color") of the corresponding top array element in stacks C, A and B. Since the values at all indices in the array elements of Stacks C, A and B are cumulative sums (when an eliminating is added to the stack, the corresponding value in the previous element is first copied, and then incremented), at any point when the stack has R nodes (wherein index R is the top level of all the stacks, so the last elements in any stack Z is denoted ZR), the "score" of stack X (i.e., its measure of latency, $L_X$) can be computed using the following implementation of the above equation for $L_{App}$ above:

$$L_x = \sum_{k=1}^{N} \{(A_R[k] \cdot f(C_R[k])) + (B_R[k] \cdot g(C_R[k]))\}$$

When the stack X is full, i.e., its size=N), $L_X=L_{app}$ After the root node is added to the stack, the next node is chosen among the un-stacked nodes by scanning the stack from bottom to top and reviewing each node element's children, and selecting the first child that is not already on the stack. As each node is added to the stack and assigned a new color, stacks C, A and B are updated and the cumulative score $L_X$ is computed.

Once the stack is full, the configuration of the "colored" nodes that make up the stack is submitted as the best partition (the partition with the lower $L_X$ value). A new minimum $L_X$ is guaranteed each time the stack is full because, if at any point the computed score of a stack (that is not full) exceeds the score of the "best partition", the top node is "recolored", or assigned a different "color". The color to be assigned is selected by scanning the stack from top to bottom for parents of the top node and assigning the top node the color of the first parent found in the stack that has not already been matched in this manner. If no parents that have not already been matched can be found in the stack, the top node is removed from the stack (its "color" property is reset) and the top node is recolored. This continues until all nodes have been removed from the stack.

In yet another embodiment of the invention, an efficiency ratio factor can be employed, which is a measure of how much a certain path uses each page it traverses. Therefore, when a certain path that is heavily traversed uses only a small fraction of a certain page's content, the "cost" of the given partition can be magnified.

It is to be appreciated that the present invention can be implemented in one of a plurality of applications. For instance, the invention can be implemented as an extension to GUI voice tool kits. The invention can be implemented during run-time for providing automatic online application optimization (e.g., runtime remodularization of a voice application). The invention can be used as a "smart feature" for existing RAD based tools. The invention can be implemented for providing an objective metric for comparison and evaluation of an applications "goodness of design". Further, the present invention can be implemented for network condition adaptation through active monitoring of server/network loads.

Moreover, by employing the present invention, an inexperienced application developer can have, in a single tool embodiment, the combined benefits of a simple and intuitive design interface for generating a functional description (flowchart interface) of an application, and an automatically-generated set of modules for efficient use of the application on a network, which heretofore have been manually crafted and written by experienced programmers and developers.

Although exemplary embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for generating a software application, comprising the steps of:
   receiving a functional description of the software application;
   automatically partitioning the functional description of the software application into a plurality of modules based on parameterized criteria; and
   automatically generating software application code for each module.

2. The method of claim 1, wherein the functional description of the software application comprises a flowchart description.

3. The method of claim 1, wherein the functional description of the software application comprises a markup description.

4. The method of claim 1, wherein the parameterized criteria comprises a measure of software application latency.

5. The method of claim 4, wherein automatically partitioning comprises:
   partitioning the functional description of the software application into a plurality of different partitions; and
   using the parameterized criteria to determine which partition, among the plurality of different partitions, provides a minimal software application latency.

6. The method of claim 5, wherein the parameterized criteria comprises a cost function, which is based on transmission and compilation time for different size modules, as the measure of software application latency.

7. The method of claim 5, wherein the parameterized criteria comprises a probability measure for determining a probability of a given path in a partition being traversed.

8. The method of claim 1, further comprising automatically generating a controller that can navigate between the modules of the software application.

9. The method of claim 1, wherein the step of receiving comprises:
   automatically fetching the functional description of the software application from a persistent storage location; and
   performing on-line dynamic remodularization of the software application.

10. The method of claim 9, wherein performing on-line dynamic remodularization comprises:
    adapting the parameterized criteria according to changes in an environment in which the software application is deployed; and
    automatically partitioning the functional description of the software application into a plurality of modules based on the adapted parameterized criteria.

11. A program storage device readable by a machine, tangibly embodying a program of instructions executable by the machine to perform method steps for generating a software application, the method steps comprising:
    receiving a functional description of the software application;
    automatically partitioning the functional description of the software application into a plurality of modules based on parameterized criteria; and
    automatically generating software application code for each module.

12. The program storage device of claim 11, wherein the functional description of the software application comprises a flowchart description.

13. The program storage device of claim 11, wherein the functional description of the software application comprises a markup description.

14. The program storage device of claim 11, wherein the parameterized criteria comprises a measure of software application latency.

15. The program storage device of claim 14, wherein the instructions for automatically partitioning comprise instructions for:
  partitioning the functional description of the software application into a plurality of different partitions; and
  using the parameterized criteria to determine which partition, among the plurality of different partitions, provides a minimal software application latency.

16. The program storage device of claim 15, wherein the parameterized criteria comprises a cost function, which is based on transmission and compilation time for different size modules, as the measure of software application latency.

17. The program storage device of claim 11, further comprising instructions for automatically generating a controller that can navigate between the modules of the software application.

18. The program storage device of claim 11, wherein the instructions for receiving the functional description of the software application comprise instructions for:
  automatically fetching the functional description of the software application from a persistent storage location; and
  performing on-line dynamic remodularization of the software application.

19. The program storage device of claim 18, wherein the instructions for performing on-line dynamic remodularization of the software application comprise instructions for:
  adapting the parameterized criteria according to changes in an environment in which the software application is deployed; and
  automatically partitioning the functional description of the software application into a plurality of modules based on the adapted parameterized criteria.

20. A computer-based system for generating a software application, comprising:
  a memory device for storing an application partition module;
  a processor in communication with the memory device, the processor operative with the application partition module to automatically partition a functional description of the software application into a plurality of modules based on parameterized criteria; and
  a code generator that automatically generates software application code for each module.

21. The computer-based system of claim 20, further comprising a user interface for enabling a user to generate the functional description of the software application.

22. The computer-based system of claim 20, wherein the functional description comprises a flowchart description.

23. The computer-based system of claim 20, wherein the functional description comprises a markup description.

24. The computer-based system of claim 20, wherein the parameterized criteria comprises a cost function for resource utilization in a computing environment in which the software application is employed.

25. The computer-based system of claim 24, wherein the computing environment comprises a network environment.

26. The computer-based system of claim 20, wherein the parameterized criteria comprises a measure of software application latency.

27. The computer-based system of claim 26, wherein the parameterized criteria comprises a cost function, which is based on transmission and compilation time for different size software application modules, as the measure of software application latency in a network environment.

28. The toot computer-based system of claim 20, wherein the code generator automatically generates a controller that can navigate between the modules of the software application.

29. A method for generating a network software application, comprising the steps of:
  receiving a functional description of the network software application;
  automatically partitioning the functional description of the network software application into a plurality of modules based on parameterized criteria of network latency; and
  automatically generating network software application code.

30. The method of claim 29, wherein the functional description of the network software application comprises a flowchart description or a markup description.

31. The method of claim 29, wherein the network software application comprises a client-server application.

32. The method of claim 29, wherein the network software application comprises a Web application.

33. The method of claim 29, wherein automatically partitioning comprises:
  partitioning the functional description of the network software application into a plurality of different partitions; and
  using the parameterized criteria to determine which partition, among the plurality of different partitions, provides a minimal network latency.

34. The method of claim 29, wherein the parameterized criteria comprises a cost function, which is based on transmission and compilation time for different size modules, as a measure of network latency.

35. The method of claim 29, wherein each module comprises a network software application view page, and wherein automatically generating network software application code comprises generating markup for each view page and generating server-side code for dispatching the view pages.

36. The method of claim 35, further comprising automatically generating a controller that can navigate between the view pages of the network software application.

* * * * *